United States Patent Office 3,464,924
Patented Sept. 2, 1969

3,464,924
POLARIZABLE FERROELECTRIC
CERAMIC COMPOSITION
Hisao Banno, Chita-gun, Shoji Maeda, Nagoya, Tsutomu Tsunooka, Kariya, and Masao Sakai, Tajimi, Japan, assignors to NGK Spark Plug Co., Ltd., Nagoya, Japan
Filed May 22, 1967, Ser. No. 639,973
Claims priority, application Japan, June 4, 1966, 41/35,687
Int. Cl. C04b 35/00
U.S. Cl. 252—62.9     9 Claims

ABSTRACT OF THE DISCLOSURE

A novel and useful polarizable ferroelectric ceramic composition for use in piezoelectric and electrostrictive ceramic article consisting essentially of $Pb(Zr-Sn-Ti)O_3$ wherein a part of the lead is replaceable by elements selected from Group II of the Periodic Table and containing at least one element selected from the group of Nb, Ta, Bi and rare earth element, and further containing Mn.

---

This invention relates broadly to compositions of matter and articles of manufacture fabricated therefrom. More particularly, the invention pertains to novel ferroelectric ceramics susceptible of electrostatic polarization and exhibiting, when polarized, electromechanical transducing properties similar to the well known piezoelectric effect. As a result of these properties, materials of the type to which the present invention pertains have come to be known and may hereinafter be referred to as "piezoelectric ceramics." While the principal product contemplated by the invention is the matured and polarized ceramic, as well as articles fabricated therefrom, it is to be understood that it also encompasses as intermediates the unreacted physical mixture of raw materials and the heat reaction product of such mixtures. Accordingly, the term "ceramic compositions" will be used herein to encompass and designate generically the composition of matter at all stages from the unreacted physical mixtures to the matured and polarized ceramic which is the ultimate product.

The feature that the ceramic of lead titanate zirconate represented by $Pb(Zr_{1-x}-Ti_x)O_3$ wherein $x=0.1$ to 0.6 shows piezoelectric and electrostrictive effect is disclosed in U.S. Letters Patent No. 2,708,244 to Bernard Jaffe. Moreover, lead titanate zirconate stannate represented by $Pb(Zr_y-Sn_z-Ti_x)O_3$ wherein $x=0.1$ to 0.6, $y=0$ to 0.9, $z=0$ to 0.65, $x+y+z=1.0$, derived from the basic composition represented by $Pb(Zr-Ti)O_3$ shows also an excellent piezoelectric and electrostrictive effect is disclosed in U.S. Letters Patent No. 2,849,409 to Jaffe et al.

Furthermore, the feature that the above mentioned basic composition represented by $Pb(Zr-Ti)O_3$ as well as $Pb(Zr-Sn-Ti)O_3$ and $Pb(Sn-Ti)O_3$ both derived from the basic composition wherein up to 30 atom percent of Pb is replaced by at least one element selected from the Group II of the Periodic Table consisting of Sr, Ca, Ba, Cd, Zn, etc. such, for example, as $(Pb-Sr)(Zr-Ti)O_3$, $(Pb-Sr-Ca)(Zr-Ti)O_3$, $(Pb-Ba)(Zr-Sn-Ti)O_3$ etc. show improved electromechanical coupling coefficient and dielectric constant is disclosed in U.S. Letters Patent Nos. 2,906,710 and 3,144,411 to Kulcsar et al., Japanese Patent No. 288,202 to Ikeda and British Patent No. 953,408.

Another feature that addition of at least one oxide selected from the oxides of Nb, Ta, and the rare earth elements including Y but excluding Ce as a second ingredient to the above mentioned basic compositions makes it possible to increase the electromechanical coupling coefficient and dielectric constant and also improve time stability is disclosed in U.S. Letters Patent No. 2,911,370 to Kulcsar.

It has also been disclosed in U.S. Letters Patent No. 3,117,094 to Roup et al. and Japanese Patent No. 301,176 to Marutake et al. that the similar effect can be obtained by addition of an oxide of Bi.

Thus, lead titanate zirconate stannate system ceramics if added with oxides of Nb, Ta, Bi, and the rare earth elements including Y but excluding Ce are transformed from hard material into soft material having a small coercive field and easily capable of effecting saturated polarization at a lower polarization potential and thus susceptable of piezoelectric characteristics. These lead titanate zirconate stannate system ceramics are widely used as a passive element such as a phonograph pickup element, a ceramic microphone element etc. However, the piezoelectric ceramics having the above mentioned compositions have small coercive field so that they are liable to lose polarity thereof when used as an active element adapted to cause displacement by supplied potential such as a speaker, a piezoelectric relay, an ultrasonic transducer etc. or as a passive element such as a piezoelectric ignitor element for generating a high potential. Thus, the piezoelectric ceramics having the above mentioned compositions have disadvantages that use thereof is limited to a comparatively low potential element.

The principal object of the invention is to obviate such disadvantages and provide a novel and useful polarizable ferroelectric ceramic composition having a comparatively high electromechanical coupling coefficient and high coercive field and highly suitable for use as an active element such as a speaker, a piezoelectric relay etc. or as a piezoelectric ignitor element.

Another object is to provide a ferroelectric ceramic composition having an improved piezoelectric ceramic composition an improved piezoelectric characteristics and improved time stability.

A feature of t heinvention is the provision of such improved ferroelectric ceramic composition which consists essentially of a first basic ingredient of lead titanate zirconate, lead titanate zirconate stannate or those wherein up to 30 atom percent of Pb is replaced by at least one element selected from Group II of the Periodic Table consisting of Ca, Sr, Ba, Zn and Cd, and added with 0.1 to 10 weight percent of at least one oxide selected from the group of oxides of Nb, Ta, Bi, and the rare earth elements including Y and excluding Ce as a second ingredient and also added with 0.05 to 5 weight percent of oxide of Mn as a third ingredient, and which has a comparatively high piezoelectric property and high coercive field without giving bad influence upon the electromechanical coupling coefficient, thereby obviating the above mentioned disadvantages of the soft material.

For a better understanding of the invention, reference is taken to the accompanying drawings which illustrate characteristics of ceramic bodies according to the invention comprising a basic composition consisting of lead titanate zirconate compound and added with bismuth oxide and manganese dioxide, in which.

Figure 1:
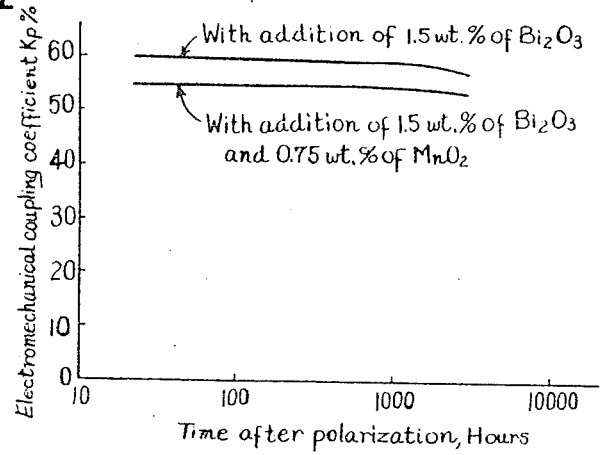
FIG. 1 is a diagram illustrating aging characteristic of electromechanical coupling coefficient $Kp$.

The invention will be explained with reference to examples.

EXAMPLE 1

PbO, TiO$_2$ and ZrO$_2$ were admixed in amount such that a basic composition represented by $$Pb(Zr_{0.53}\text{-}Ti_{0.47})O_3$$

and a basic composition represented by $$Pb(Zr_{0.50}\text{-}Ti_{0.50})O_3$$

were obtained. These basic compositions were added with 1.5 weight percent of Bi$_2$O$_3$ with or without 0.75 weight percent of MnO$_2$ and the compositions thus obtained were mixed, ground, molded and calcined at a temperature of 700 to 1,000° C. The reaction product thus obtained was ground again, molded and matured in PbO atmosphere at a temperature of 1,100 to 1,300° C. to obtain a disk shaped sintered product having a dimension of about 20 mm. dia. x 0.8 mm. thickness.

Both surfaces of the disk thus obtained were electroded. Then, the disk was polarized by applying a direct current electric field of 40 kv./cm. at a temperature of 80° C. for about 30 minutes and stored in the air at room temperature for one week. The electromechanical coupling coefficient K$p$ and coercive field E$c$ of the disk thus treated were measured and the results thereof were shown in the following Table 1.

TABLE 1

| Sample No. | Basic composition | Addition (wt., percent) Bi$_2$O$_3$ | MnO$_2$ | Electro-mechanical coupling coefficient Kp (percent) | Coercive field Ec (kv./cm.) |
|---|---|---|---|---|---|
| 1A | Pb(Zr$_{0.53}$-Ti$_{0.47}$)O$_3$ | 1.5 | 0 | 60 | 8 |
| 1B | Pb(Zr$_{0.53}$-Ti$_{0.47}$)O$_3$ | 1.5 | 0.75 | 55 | 18 |
| 2A | Pb(Zr$_{0.50}$-Ti$_{0.50}$)O$_3$ | 1.5 | 0 | 58 | 15 |
| 2B | Pb(Zr$_{0.50}$-Ti$_{0.50}$)O$_3$ | 1.5 | 0.75 | 53 | 22 |

EXAMPLE 2

The basic composition represented by $$Pb(Zr_{0.53}\text{-}Ti_{0.47})O_3$$

was added with Nb$_2$O$_5$, Ta$_2$O$_5$, La$_2$O$_3$ and Sm$_2$O$_3$ with or without MnO$_2$. The composition thus obtained was treated under the same conditions as those in Example 1 to obtain a ceramic disk. The electromechanical coupling coefficient K$p$ and coercive field E$c$ of the disk thus obtained were measured and the results thereof were shown in the following Table 2.

TABLE 2

| Sample No. | Basic composition | Addition | Electro-mechanical coupling coefficient Kp (percent) | Coercive field Ec (kv./cm.) |
|---|---|---|---|---|
| 3A | Pb(Zr$_{0.53}$-Ti$_{0.47}$)O$_3$ | 1.5 wt. percent Nb$_2$O$_5$ | 59 | 6 |
| 3B | Pb(Zr$_{0.53}$-Ti$_{0.47}$)O$_3$ | 1.5 wt. percent Nb$_2$O$_5$ plus 0.75 wt. percent MnO$_2$ | 55 | 16 |
| 4A | Pb(Zr$_{0.53}$-Ti$_{0.47}$)O$_3$ | 1.5 wt. percent Ta$_2$O$_5$ | 61 | 9 |
| 4B | Pb(Zr$_{0.53}$-Ti$_{0.47}$)O$_3$ | 1.5 wt. percent Ta$_2$O$_5$ plus 0.75 wt. percent MnO$_2$ | 57 | 20 |
| 5A | Pb(Zr$_{0.53}$-Ti$_{0.47}$)O$_3$ | 1.5 wt. percent La$_2$O$_3$ | 59 | 4 |
| 5B | Pb(Zr$_{0.53}$-Ti$_{0.47}$)O$_3$ | 1.5 wt. percent La$_2$O$_3$ plus 0.75 wt. percent MnO$_2$ | 58 | 12 |
| 6A | Pb(Zr$_{0.53}$-Ti$_{0.47}$)O$_3$ | 1.5 wt. percent Sm$_2$O$_3$ | 57 | 5 |
| 6B | Pb(Zr$_{0.53}$-Ti$_{0.47}$)O$_3$ | 1.5 wt. percent Sm$_2$O$_3$ plus 0.75 wt. percent MnO$_2$ | 56 | 15 |

EXAMPLE 3

The basic composition represented by Pb(Zr$_{1-x}$-Ti$_x$)O$_3$ was added with 2 weight percent of Bi$_2$O$_3$ with or without 1 weight percent of MnO$_2$. The compositions thus obtained were treated under the same conditions as those in the Example 1 to obtain ceramic disks. The electromechanical coupling coefficient K$p$ and coercive field E$c$ of the disks thus obtained were measured and the results thereof were shown in the following Table 3.

TABLE 3

| Sample No. | Basic composition | Addition, wt. percent Bi$_2$O$_3$ | MnO$_2$ | Electro-mechanical coupling coefficient Kp (percent) | Coercive field Ec (kv./cm.) |
|---|---|---|---|---|---|
| 7A | Pb(Zr$_{0.9}$-Ti$_{0.1}$)O$_3$ | 2 | 0 | 28 | 6.3 |
| 7B | Pb(Zr$_{0.9}$-Ti$_{0.1}$)O$_3$ | 2 | 1 | 26 | 14.2 |
| 8A | Pb(Zr$_{0.8}$-Ti$_{0.2}$)O$_3$ | 2 | 0 | 30 | 6.3 |
| 8B | Pb(Zr$_{0.8}$-Ti$_{0.2}$)O$_3$ | 2 | 1 | 27 | 15.4 |
| 9A | Pb(Zr$_{0.7}$-Ti$_{0.3}$)O$_3$ | 2 | 0 | 32 | 6.8 |
| 9B | Pb(Zr$_{0.7}$-Ti$_{0.3}$)O$_3$ | 2 | 1 | 31 | 16.0 |
| 10A | Pb(Zr$_{0.6}$-Ti$_{0.4}$)O$_3$ | 2 | 0 | 42 | 7.3 |
| 10B | Pb(Zr$_{0.6}$-Ti$_{0.4}$)O$_3$ | 2 | 1 | 39 | 17.2 |
| 11A | Pb(Zr$_{0.5}$-Ti$_{0.5}$)O$_3$ | 2 | 0 | 54 | 13.9 |
| 11B | Pb(Zr$_{0.5}$-Ti$_{0.5}$)O$_3$ | 2 | 1 | 54 | 22.3 |
| 12A | Pb(Zr$_{0.4}$-Ti$_{0.6}$)O$_3$ | 2 | 0 | 33 | 14.3 |
| 12B | Pb(Zr$_{0.4}$-Ti$_{0.6}$)O$_3$ | 2 | 1 | 30 | 23.4 |

EXAMPLE 4

The basic composition represented by $$Pb(Zr_{0.53}\text{-}Ti_{0.47})O_3$$

was added with Ta$_2$O$_5$ and MnO$_2$ in weight ratio of Ta$_2$O$_5$:MnO$_2$=2:1, while the same basic composition was added with Ta$_2$O$_5$ only. These compositions thus obtained were treated under the same conditions as those in Example 1 to obtain ceramic disks. The electromechanical coupling coefficient K$p$ and coercive field E$c$ of the disks thus obtained were measured and the results thereof were shown in the following Table 4.

TABLE 4

| Sample No. | Basic composition | Addition, wt. percent Ta$_2$O$_5$ | MnO$_2$ | Electro-mechanical coupling coefficient Kp (percent) | Coercive field Ec (kv./cm.) |
|---|---|---|---|---|---|
| 13 | Pb(Zr$_{0.53}$-Ti$_{0.47}$)O$_3$ | 0 | 0 | 42 | 14 |
| 4A* | Pb(Zr$_{0.53}$-Ti$_{0.47}$)O$_3$ | 1.5 | 0 | 61 | 9 |
| 4B* | Pb(Zr$_{0.52}$-Ti$_{0.47}$)O$_3$ | 1.5 | 0.75 | 57 | 20 |
| 14A | Pb(Zr$_{0.53}$-Ti$_{0.47}$)O$_3$ | 3.0 | 0 | 60 | 9.5 |
| 14B | Pb(Zr$_{0.53}$-Ti$_{0.47}$)O$_3$ | 3.0 | 1.5 | 60 | 21 |
| 15A | Pb(Zr$_{0.53}$-Ti$_{0.47}$)O$_3$ | 5.0 | 0 | 52 | 10 |
| 15B | Pb(Zr$_{0.53}$-Ti$_{0.47}$)O$_3$ | 5.0 | 2.5 | 55 | 22 |
| 16A | Pb(Zr$_{0.53}$-Ti$_{0.47}$)O$_3$ | 8.0 | 0 | 40 | 11 |
| 16B | Pb(Zr$_{0.53}$-Ti$_{0.47}$)O$_3$ | 8.0 | 4.0 | 42 | 23 |

*These samples 4A and 4B were the same as those shown in the Table 2 of the Example 2 and were shown for the sake of comparison with the other samples in the above Table 4.

EXAMPLE 5

The basic compositions wherein a part of Pb thereof was replaced by Sr, Ca, Cd, Zn were added with Bi$_2$O$_3$ or Nb$_2$O$_5$ with or without MnO$_2$. The compositions thus obtained were treated under the same conditions as those in the Example 1 to obtain ceramic disks. The electromechanical coupling coefficient K$p$ and coercive field E$c$ of the disks thus obtained were measured and the results thereof were shown in the following Table 5.

TABLE 5

| Sample No. | Basic composition | Addition, wt. percent | | | Electromechanical coupling coefficient Kp (percent) | Coercive field Ec (kv./cm.) |
|---|---|---|---|---|---|---|
| | | $Bi_2O_3$ | $Nb_2O_5$ | $MnO_2$ | | |
| 20A | $(Pb_{0.95}\text{-}Sr_{0.05})(Zr_{0.55}\text{-}Ti_{0.45})O_3$ | 2 | 0 | 0 | 62 | 6.2 |
| 20B | $(Pb_{0.95}\text{-}Sr_{0.05})(Zr_{0.55}\text{-}Ti_{0.45})O_3$ | 2 | 0 | 1 | 58 | 14.5 |
| 21A | $(Pb_{0.95}\text{-}Ca_{0.05})(Zr_{0.55}\text{-}Ti_{0.45})O_3$ | 2 | 0 | 0 | 53 | 6.5 |
| 21A | $(Pb_{0.95}\text{-}Ca_{0.05})(Zr_{0.55}\text{-}Ti_{0.45})O_3$ | 2 | 0 | 1 | 51 | 14.0 |
| 22A | $(Pb_{0.99}\text{-}Cd_{0.01})(Zr_{0.55}\text{-}Ti_{0.45})O_3$ | 2 | 0 | 0 | 52 | 8.4 |
| 22B | $(Pb_{0.99}\text{-}Cd_{0.01})(Zr_{0.55}\text{-}Ti_{0.45})O_3$ | 2 | 0 | 1 | 52 | 21.0 |
| 23A | $(Pb_{0.99}\text{-}Zn_{0.01})(Zr_{0.55}\text{-}Ti_{0.45})O_3$ | 2 | 0 | 0 | 46 | 8.2 |
| 23B | $(Pb_{0.99}\text{-}Zn_{0.01})(Zr_{0.55}\text{-}Ti_{0.45})O_3$ | 2 | 0 | 1 | 46 | 17.4 |
| 24A | $(Pb_{0.95}\text{-}Sr_{0.05})(Zr_{0.54}\text{-}Ti_{0.46})O_3$ | 0 | 2 | 0 | 65 | 12.0 |
| 24B | $(Pb_{0.95}\text{-}Sr_{0.05})(Zr_{0.54}\text{-}Ti_{0.46})O_3$ | 0 | 2 | 0.5 | 60 | 25.0 |

EXAMPLE 6

The basic compositions represented by $$(Pb_{1-a}\text{-}Ba_a)(Zr_{0.55}\text{-}Ti_{0.45})O_3$$

wherein a part of Pb of the basic composition represented by $Pb(Zr_{0.55}\text{-}Ti_{0.45})O_3$ was replaced by Ba were added with 2 weight percent of $Bi_2O_3$ with or without 1 weight percent of $MnO_2$. The compositions thus obtained were treated under the same conditions as those in the Example 1 to obtain ceramic discs. The electromechanical coupling coefficient Kp and coercive field Ec of the disks thus treated were measured and the results thereof were shown in the following Table 6.

As can be seen from the Examples 1 to 7, the composition added with $MnO_2$ according to the invention renders it possible to remarkably improve the coercive field without substantially reducing the electromechanical coupling coefficient thereof if compared with those without addition of $MnO_2$ and, particularly, make the coercive field of the former about twice and maximum thrice that of the latter.

EXAMPLE 8

The basic composition represented by $$Pb(Zr_{0.50}\text{-}Ti_{0.50})O_3$$

was added with 1.5 weight percent of $Bi_2O_3$ with or without 0.75 weight percent of $MnO_2$. The compositions thus

TABLE 6

| Sample No. | Basic composition | Addition, wt. percent | | Electromechanical coupling coefficient Kp (percent) | Coercive field Ec (kv./cm.) |
|---|---|---|---|---|---|
| | | $Bi_2O_3$ | $MnO_2$ | | |
| 25 | $Pb(Zr_{0.55}\text{-}Ti_{0.45})O_3$ | 0 | 0 | 55 | 7.8 |
| 26A | $(Pb_{0.95}\text{-}Ba_{0.05})(Zr_{0.55}\text{-}Ti_{0.45})O_3$ | 2 | 0 | 57 | 8.3 |
| 26B | $(Pb_{0.95}\text{-}Ba_{0.05})(Zr_{0.55}\text{-}Ti_{0.45})O_3$ | 2 | 1 | 54 | 14.3 |
| 27A | $(Pb_{0.90}\text{-}Ba_{0.10})(Zr_{0.55}\text{-}Ti_{0.45})O_3$ | 2 | 0 | 58 | 8.5 |
| 27B | $(Pb_{0.90}\text{-}Ba_{0.10})(Zr_{0.55}\text{-}Ti_{0.45})O_3$ | 2 | 1 | 55 | 15.4 |
| 28A | $(Pb_{0.85}\text{-}Ba_{0.15})(Zr_{0.55}\text{-}Ti_{0.45})O_3$ | 2 | 0 | 57 | 8.3 |
| 28B | $(Pb_{0.85}\text{-}Ba_{0.15})(Zr_{0.55}\text{-}Ti_{0.45})O_3$ | 2 | 1 | 56 | 16.3 |
| 29A | $(Pb_{0.80}\text{-}Ba_{0.20})(Zr_{0.55}\text{-}Ti_{0.45})O_3$ | 2 | 0 | 54 | 9.0 |
| 29B | $(Pb_{0.80}\text{-}Ba_{0.20})(Zr_{0.55}\text{-}Ti_{0.45})O_3$ | 2 | 1 | 53 | 17.2 |
| 30A | $(Pb_{0.75}\text{-}Ba_{0.25})(Zr_{0.55}\text{-}Ti_{0.45})O_3$ | 2 | 0 | 50 | 10.0 |
| 30B | $(Pb_{0.75}\text{-}Ba_{0.25})(Zr_{0.55}\text{-}Ti_{0.45})O_3$ | 2 | 1 | 50 | 14.3 |

EXAMPLE 7

Figure 2:
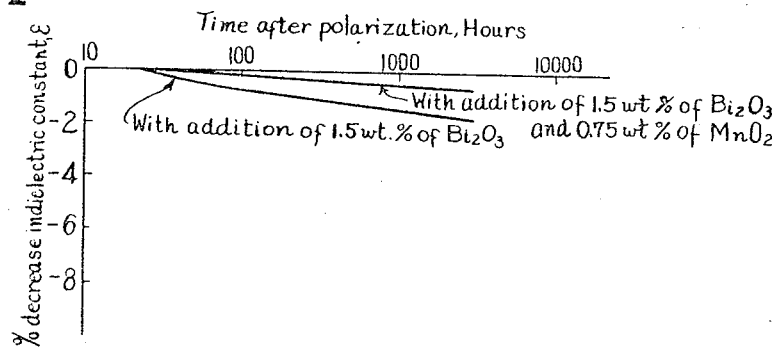
FIG. 2 is a diagram illustrating aging characteristic of dielectric constant $\epsilon$.
Figure 3:
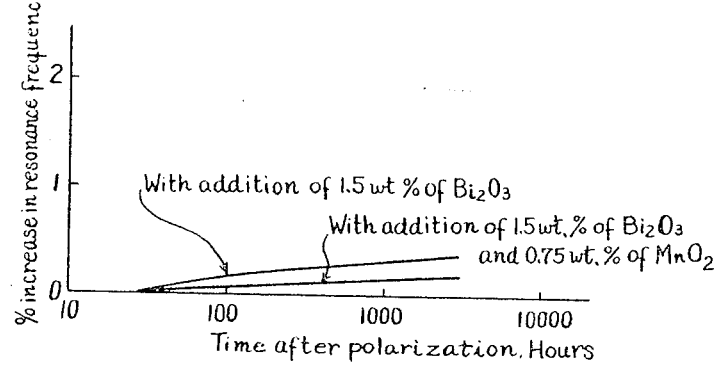
FIG. 3 is a diagram illustrating aging characteristic of resonance frequency Fr.

The basic compositions represented by $$Pb(Zr_{0.55-z}\text{-}Sn_z\text{-}Ti_{0.45})O_3$$

were added with 2 weight percent of $Bi_2O_3$ with or without 1 weight percent of $MnO_2$. The compositions thus obtained were treated under the same conditions as those in the Example 1 to obtain ceramic disks. The electromechanical coupling coefficient Kp and ceramic field Ec of the disks thus treated were measured and the results thereof were shown in the following Table 7.

obtained were treated under the same conditions as those in the Example 1 to obtain ceramic disks. The disks thus treated were stored in the air at room temperature and the aging characteristics of the electromechanical coupling coefficient Kp, dielectric constant $\epsilon$ and resonance frequency Fr thereof were measured and the results thereof were shown in FIGS. 1 to 3. As can be seen from these drawings, the aging characteristics of the basic compositions added with 1.5 weight percent of $Bi_2O_3$ and 0.75 weight percent of $MnO_2$ were extremely slight in variation if compared with those of the basic composition added

TABLE 7

| Sample No. | Basic composition | Addition, wt. percent | | Electromechanical coupling coefficient Kp (percent) | Coercive field Ec (kv./cm.) |
|---|---|---|---|---|---|
| | | $Bi_2O_3$ | $MnO_2$ | | |
| 31A | $Pb(Zr_{0.45}\text{-}Sn_{0.10}\text{-}Ti_{0.45})O_3$ | 2 | 0 | 52 | 8.3 |
| 31B | $Pb(Zr_{0.45}\text{-}Sn_{0.10}\text{-}Ti_{0.45})O_3$ | 2 | 1 | 50 | 16.3 |
| 32A | $Pb(Zr_{0.35}\text{-}Sn_{0.20}\text{-}Ti_{0.45})O_3$ | 2 | 0 | 52 | 8.5 |
| 32B | $Pb(Zr_{0.35}\text{-}Sn_{0.20}\text{-}Ti_{0.45})O_3$ | 2 | 1 | 51 | 17.4 |
| 33A | $Pb(Zr_{0.25}\text{-}Sn_{0.30}\text{-}Ti_{0.45})O_3$ | 2 | 0 | 53 | 8.6 |
| 33B | $Pb(Zr_{0.25}\text{-}Sn_{0.30}\text{-}Ti_{0.45})O_3$ | 2 | 1 | 49 | 18.3 |
| 34A | $Pb(Zr_{0.15}\text{-}Sn_{0.40}\text{-}Ti_{0.45})O_3$ | 2 | 0 | 52 | 9.0 |
| 34B | $Pb(Zr_{0.15}\text{-}Sn_{0.40}\text{-}Ti_{0.45})O_3$ | 2 | 1 | 48 | 19.3 |
| 35A | $Pb(Zr_{0.05}\text{-}Sn_{0.50}\text{-}Ti_{0.45})O_3$ | 2 | 0 | 50 | 10.1 |
| 35B | $Pb(Zr_{0.05}\text{-}Sn_{0.50}\text{-}Ti_{0.45})O_3$ | 2 | 1 | 45 | 18.4 | with 1.5 weight per cent of $Bi_2O_3$ only, which showed the advantageous effect of $MnO_2$.

In carrying out the invention into effect, at least one element selected from the group consisting of Nb, Ta, Bi and the rare earth elements including Y but excluding Ce to be added as the second ingredient and Mn to be added as the third ingredient may be added in the form of powder or of various kinds of compounds including the other elements. The second ingredient must be added in an aggregate quantity equivalent to from 0.1 to 10 weight percent of respective oxide, while the third ingredient must be added in an aggregate quantity equivalent to from 0.05 to 5.0 weight percent of manganese dioxide. The reason why the lower limits of the second and third ingredients are limited to 0.1 weight percent and 0.05 weight percent, respectively, is as follows. These ingredients serve to act sensitively even if they are added in an extremely small amount. 0.1 weight percent of the second ingredient and 0.05 weight percent of the third ingredient are sufficient to obtain the advantageous effects thereof. While, the reason why the upper limits of the second and third ingredients are limited to 10.0 weight percent and 5.0 weight percent, respectively, is as follows. Addition of more than the above upper limits causes a remarkable decrease of the electromechanical coupling coefficient of the ceramic composition. It is preferable to use from 0.5 to 5.0 weight percent of the second ingredient and from 0.25 to 2.5 weight percent of the third ingredient for the purpose of improving the electromechanical coupling coefficient of the ceramic composition.

The reason why the values of $x$, $y$ and $z$ of $$Pb(Zr_{1-x}-Ti_x)O_3$$

and of $$Pb(Zr_y-Sn_z-Ti_x)O_3$$

derived from the former are limited to $x=0.1$ to 0.6, $y=0$ to 0.9, $z=0$ to 0.65 and $x+y+z=1.0$ is that the basic compositions limited in the above range show a practically available values of the electromechanical coupling coefficient and remarkably improve the coercive field of the basic compositions.

The reason why the amount of Pb of the basic composition represented by $Pb(Zr-Ti)O_3$ or $Pb(Zr-Sn-Ti)O_3$ to be replaced by at least one element selected from Group II of the Periodic Table is limited to up to 30 atom percent is that such amount of Pb to be replaced has been formed as the upper limit thereof in order to obtain the practically desirable value of the electromechanical coupling coefficient.

As above mentioned, the invention that lead titanate zirconate system ceramic composition consisting of lead titanate zirconate, lead titanate zirconate stannate or those zirconate and stannate in which a part of the lead is replaced by Ba, Ca, Sr, Cd, Zn, etc. is added as the second ingredient with at least one oxide of Nb, Ta, Bi, and the rare earth elements including Y but excluding cerium, and added as the third ingredient with $MnO_2$ ensures an extremely good time stabilities with only slightly decreasing the electromechanical coupling coefficient $Kp$ but without departing from the practical range thereof and further provides the important advantage that coercive field $Ec$ is remarkably improved. Thus, the lead titanate zirconate system ceramic composition according to the invention can be applied effectively to the fabrication of elements adapted to cause displacement by supplied potential such as a speaker, a piezoelectric relay, an ultrasonic transducer, etc. and a piezoelectric ignitor element for generating high voltage etc.

What we claim is:

1. A polarizable ferroelectric ceramic composition consisting essentially of a compound represented by the formula selected from $Pb(Zr_{1-x}-Ti_x)O_3$, wherein $x=0.1$ to 0.6, and $Pb(Zr_y-Sn_z-Ti_x)O_3$, wherein $x=0.1$ to 0.6, $y=0$ to 0.9, $z=0$ to 0.65 and $x+y+z=1.0$, and containing at least one element selected from the group consisting of niobium, tantalum, bismuth, and the rare earth elements including yttrium but excluding cerium in an aggregate quantity equivalent to from 0.1 to 10.0 weight percent of respective oxide, and further containing manganese in an aggregate quantity equivalent to from 0.05 to 5.0 weight percent of manganese dioxide.

2. A polarizable ferroelectric ceramic composition as claimed in claim 1 wherein up to 30 atom percent of the lead is replaced by at least one element selected from Group II of the Periodic Table consisting of calcium, strontium, barium, zinc and cadmium.

3. A polarizable ferroelectric ceramic composition consisting essentially of a compound represented by the formula selected from $Pb(Zr_{1-x}-Ti_x)O_3$, wherein $x=0.1$ to 0.6, and $Pb(Zr_y-Sn_z-Ti_x)O_3$, wherein $x=0.1$ to 0.6, $y=0$ to 0.9, $z=0$ to 0.65 and $x+y+z=1.0$, and containing at least one element selected from the group consisting of niobium, tantalum, bismuth, and the rare earth elements including yttrium but excluding cerium in an aggregate quantity equivalent to from 0.5 to 5.0% by weight of respective oxide and further containing manganese in an aggregate quantity equivalent to from 0.25 to 2.5% by weight of manganese dioxide.

4. A polarizable ferroelectric ceramic composition as claimed in claim 3 wherein up to 30 atom percent of the lead is replaced by at least one element selected from Group II of the Periodic Table consisting of calcium, strontium, barium, zinc and cadmium.

5. An electrically polarized ceramic body consisting essentially of a compound represented by the formula selected from $$Pb(Zr_{1-x}-Ti_x)O_3$$

or $$Pb(Zr_y-Sn_z-Ti_x)O_3$$

wherein $x=0.1$ to 0.6, $y=0$ to 0.9, $z=0$ to 0.65 and $x+y+z=1.0$, and containing niobium in an aggregate quantity equivalent to from 0.5 to 5.0 weight percent of $Nb_2O_5$, and further containing manganese in an aggregate quantity equivalent to from 0.25 to 2.5 weight percent of $MnO_2$.

6. An electrically polarized ceramic body as claimed in claim 5, wherein up to 30 atom percent of the lead is replaced by strontium.

7. An electrically polarized ceramic body consisting essentially of a compound represented by the formula $$Pb(Zr_{1-x}-Ti_x)O_3$$

or $$Pb(Zr_y-Sn_z-Ti_x)O_3$$

wherein $x=0.1$ to 0.6, $y=0$ to 0.9, $z=0$ to 0.65 and $x+y+z=1.0$, and containing tantalum in an aggregate quantity equivalent to from 0.5 to 5.0 weight percent of $Ta_2O_5$, and further containing manganese in an aggregate quantity equivalent to from 0.25 to 2.5 weight percent of $MnO_2$.

8. An electrically polarized ceramic body consisting essentially of a compound represented by the formula $$Pb(Zr_{1-x}-Ti_x)O_3$$

or $$Pb(Zr_y-Sn_z-Ti_x)O_3$$

wherein $x=0.1$ to 0.6, $y=0$ to 0.9, $z=0$ to 0.65 and $x+y+z=1.0$, and containing bismuth in an aggregate quantity equivalent to from 0.5 to 5.0 weight percent of $Bi_2O_3$, and further containing manganese in an aggregate quantity equivalent to from 0.25 to 2.5 weight percent of $MnO_2$.

9. An electrically polarized ceramic body as claimed in claim 8 wherein up to 30 atom percent of the lead is replaced by barium.

References Cited

UNITED STATES PATENTS

| 3,117,094 | 1/1964 | Roup et al. | 252—62.9 |
| 3,372,121 | 3/1968 | Banno | 252—62.9 |

FOREIGN PATENTS

| 1,463,876 | 12/1966 | France. |
| 1,462,270 | 12/1966 | France. |

TOBIAS E. LEVOW, Primary Examiner

J. COOPER, Assistant Examiner

U.S. Cl. X.R.

106—39

UNITED STATES PATENT OFFICE
CERTIFICATE OF CORRECTION

Patent No. 3,464,924 September 2, 1969

Hisao Banno et al.

It is certified that error appears in the above identified patent and that said Letters Patent are hereby corrected as shown below:

Column 2, line 15, "susceptable" should read -- susceptible --. Columns 5 and 6, TABLE 5, fifth column, line 6 thereof, "0" should read -- 1 --; same TABLE 5, sixth column, line 6 thereof, "52" should read -- 50 --. Column 5, line 26, "discs" should read -- disks --. Columns 5 and 6, TABLE 7, sixth column, line 10 thereof, "18.4" should read -- 18.3 --.

Signed and sealed this 10th day of November 1970.

(SEAL)
Attest:

Edward M. Fletcher, Jr.  WILLIAM E. SCHUYLER, JR.
Attesting Officer  Commissioner of Patents